April 11, 1950     T. M. YARBROUGH     2,503,535

BOAT TRAILER

Filed March 21, 1949

Inventor

Thomas M. Yarbrough

By *Clarence A. O'Brien and Harvey B. Jacobson*

Attorneys

Patented Apr. 11, 1950

2,503,535

UNITED STATES PATENT OFFICE 2,503,535

BOAT TRAILER

Thomas M. Yarbrough, Nashville, Tenn.

Application March 21, 1949, Serial No. 82,587

3 Claims. (Cl. 280—33.4)

The present invention relates to new and useful improvements in boat trailers such as are used to transport a boat to and from a beach or shore and to assist in launching and otherwise handling the boat when the same is either put out or taken ashore, as the case may be.

It will be evident from the given statement of the invention that I am aware that there are many and varied styles and forms of small boat carting trailers and that it is not new to make a trailer of buoyant stock so that it will be floatable and susceptible of strapped maintenance on the boat even after the latter is tied off-shore or otherwise anchored. As a matter of fact, the art to which the invention relates is recognized as being active; also that different makes and forms of trailers shade almost imperceptibly from one type to another. With a view toward more aptly and satisfactorily conforming to what I consider to be the significant requirements in this line of endeavor, I aim, notwithstanding the presence of similar trailers used by competitors, to provide one which is possessed of appreciable simplicity in designing and construction, is sturdy and reliable and has certain structural advantages which, to my mind, are improvements susceptible of unqualified acceptance and approval by both manufacturers and users.

One thing I subscribe to as worthy of adoption and use in a boat trailer is the provision of means to reliably base and seat the keel portion of the boat on the usual wheeled frame. Therefore, it is an object of the invention to provide a well balanced easily cartable trailer in which a properly shaped wheel supported frame has central longitudinally extending tracking and racking means which, with requisite niceties, accommodates the keel portion of the boat body and expedites the steps of sliding the boat into position when it is being loaded on the trailer and slipping it off of the frame for unhampered launching.

More specifically, in carrying out the principles of my invention, I contemplate the adoption and use of a substantially semi-elliptical main frame with readily rollable wheels at the trailing end and with an appropriate draft hitch at the apex end and wherein a pair of transversely disposed hingedly mounted spring suspended boards, at said trailing end, constitute the aforementioned adjusting and accommodating bolster means.

Further, and in respect, more particularly, to the stated keel adapter means, this, in its preferred form, has to do with a pair of longitudinally extending rails in close spaced parallelism which function as skids and keel retainers which are provided at their forward end portions with stabilizing cleats or blocks.

Other objects and advantages will become more readily apparent from the following description and the accompanying illustrative drawings.

In the drawings, wherein like numerals are employed to designate like parts throughout the views.

Figure 1:
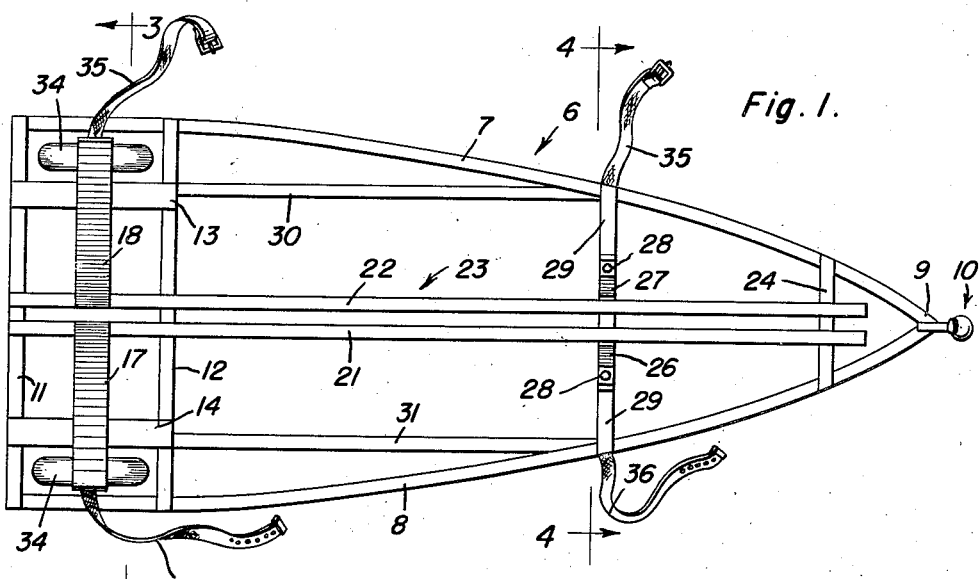
Figure 1 is a top plan view of a boat trailer constructed in accordance with the principles of the present invention.
Figure 2:
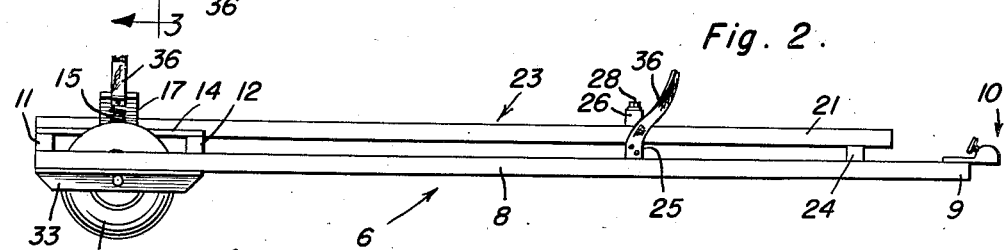
Figure 2 is a side elevational view of the same.
Figure 3:
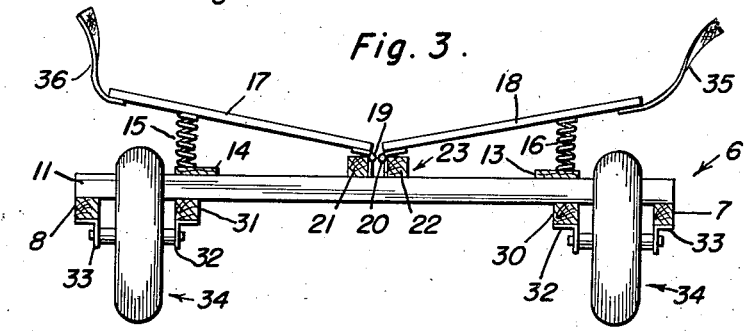
Figure 4:
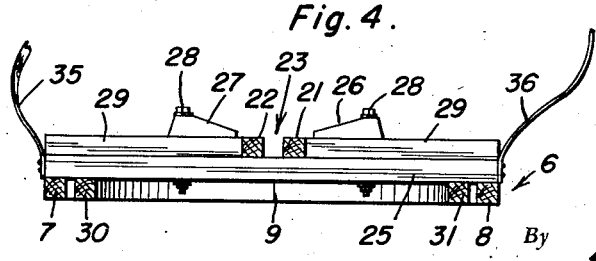

Figures 3 and 4 are cross-sections on the lines 3—3 and 4—4, respectively, of Figure 1, looking in the direction of the arrows.

Briefly reviewed and before taking up the detailed description, it will be seen in Figure 1 that the main frame is semi-elliptical in top plan, has suitable cross braces at longitudinally spaced points, has hitch means at the forward end and wheel-supporting means at the rear end. Also at the latter end I provide the aforementioned spring cushioned bolsters and along the central longitudinal portion I provide the rails which go to make up the keel adapter means.

Referring now to the drawings by distinguishing reference numerals it will be seen that the main frame is denoted by the numeral 6, that it is horizontally elongated and, in top plan, is substantially semi-elliptical in form. The main frame members 7 and 8, which are duplicates, are suitably bowed and are joined appropriately together at the forward end as at 9. At this end portion I provide suitable hitch or coupling means 10 attachable to an automobile or equivalent powering vehicle. There is a transverse cross brace 11 at the rear connecting the rear end portions of said frame members 7 and 8. Ahead of this and parallel thereto and inwardly of the trailing end of the trailer I provide a similar complemental cross brace 12. These two cross braces serve to carry horizontal boards 13 and 14 which are not only additional braces but are primarily adapted to accommodate the coiled cushioning springs 15 and 16 shown in Figure 3. These springs serve to support the outer free swingable end portions of a pair of short planks 17 and 18 which constitute the aforementioned boat accommodating and adapting bolsters. The inner adjacent ends of said bolsters are connected by hinges 19 and 20 to close spaced longitudinal rails or stringers 21 and 22 which, together, define the aforementioned keel adapter track construction 23. The forward end portions of the rails 21 and 22, which terminate inwardly of the hitch 10, are connected with a short cross brace 24 as shown in Figure 1. Then, rearwardly of this cross brace is another cross brace 25 which, as shown in Figure 4, assists in stabilizing the rails. I call attention at this point to the wedge-shaped blocks or cleats 26 and 27 which are bolted as at 28 to the cross brace 25. In order to put the blocks on the desired plane I employ filler pieces or risers 29 and these are fastened, by the same bolts 28, to the underlying cross brace 25. With the blocks 26 and 27 in proper opposed relation and on opposite spaced sides of the keel adapted track, it is obvious that the boat is supported substantially throughout its length and by way of its keel portion, on the frame structure. The bolster members at the rear are spaced apart so that the coacting portion of the keel passes between the hinged ends of the bolsters. Consequently, the spring suspended bolsters are in close and allied relationship to the rails which go to make up the novel keel adapting track. What with the bolsters, track means and blocks and a satisfactory arrangement of braces, a wheel supporting frame is thus had which, to my mind, is superior to anything which has been done along this line by others.

As a further factor of strength and stability, I deem it advisable to provide longitudinal braces and these are denoted by the numerals 30 and 31 and attached at their rear ends to the cross braces 11 and 12 and at their forward ends to the intermediate inner sides of the bowed frame members 7 and 8.

These braces 31 also come in handy in cooperating with the frame members as convenient and satisfactory mounts for angle irons 32 and 33 arranged in proper pairs and which, in turn, serve as appropriate hangers or mounts for the industrial type wheels 34 illustrated.

I may also mention buckle-equipped straps 35 on one side of the frame structure to accommodate coacting straps 36 at longitudinally spaced points on the other side of the frame structure. These straps, in conjunction with the other provisions offered, provide a highly satisfactory and reliable foundation for the boat to be transported and carted.

Inasmuch as from the manufacturer's point of view, materials and construction are worthy of consideration, I direct attention to the following additional relevant factors, to wit:

Wood framing material to be of oak, 2 x 2 nominal dimension, finished on four sides and free from all knots, splits, shapes or other imperfections which would render the material structurally unsound.

Rear bolster leaves to be made of 1 x 5 (net dimension) #1 yellow pine or oak.

Angle iron for steel mountings to be 2½ x 1½ x ¼ standard section and regular mill grade with holes drilled to detail.

Rear bolster springs are to be standard helical type springs with square ends, 1½" diameter, with a comprehensive strength of 100# per spring.

Wheels to be, as illustrated, high speed industrial type wheels, ball or roller bearing, with grease retainers and one Zerk or grease fitting on the hub. Tires for wheels to be 4" x 8" in size.

Bolts for construction of trailer to be to size as detailed and machine or stave type. Smaller size bolts permissible to be ⅜" diameter.

Hinges for bolsters to be 4" T type and fastened down with wood screws. Hitch to be standard ball and socket type made of malleable iron.

All jointings and fastenings to be bolted or screwed. Use of nails not permissible except for temporary use.

Trailer to be squared away in the rear and wheels set true to line.

Painting to be two shop coats of standard brand of aluminum paint.

This trailer recommended for boats 8' to 16' in length, weight 1000 lb. capacity.

This trailer will float. Boat can be launched in water 19" to any depth with little effort.

Size of trailer as shown. Maximum size 72" wide, 144" in length. Original size as per detail.

Boat hold down consists of webb straps 1½" wide, 7' and 8' long. Turnbuckle attached to hitch for front of boat.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A boat carting and launching trailer of the type shown and described comprising a main frame provided at its forward end with hitching means and at its rearward end with freely rollable supporting, transporting and carting wheels, a central longitudinally extending keel adapting track mounted rigidly on said frame, said track embodying opposed complemental rails disconnected at their respective forward and rear ends to facilitate feeding and sliding the keel of the boat on and off of said frame, and a pair of upwardly and outwardly inclined bolster members hingedly connected at their inner ends to the rear end portions of said rails, and cushioning springs supported on said frame, the outer swingable end portions of said bolsters being attached to and cushioned by said springs.

2. A boat trailer of the class described comprising a substantially semi-elliptical frame embodying longitudinally bowed frame members connected together at their forward ends, transverse braces connected to the rear end portions of said members, additional transverse braces connected to the forward and intermediate portions of said frame members, a pair of spaced parallel longitudinally extending stringers superimposed upon and attached to the central portions of the respective brace members, supporting wheels for the rear end portions of said frame, hingedly mounted transversely extending bolsters connected to the rear end portions of said stringers, coiled springs supported from said first-named brace members, said bolsters having their outer swingable ends seated on said coiled springs.

3. The structure specified in claim 2, wherein risers are fixedly mounted atop the forward brace, and wedge-shaped cleats are superimposed on and secured to said risers, said cleats being individually located on opposite sides of said stringers.

THOMAS M. YARBROUGH.

REFERENCES CITED

The following references are of record in the file of this patent:

UNITED STATES PATENTS

| Number | Name | Date |
|---|---|---|
| 758,228 | Westlake | Apr. 26, 1904 |
| 1,779,887 | Melanson | Oct. 28, 1930 |
| 2,211,083 | Smith | Aug. 13, 1940 |
| 2,332,991 | Commire | Oct. 26, 1943 |
| 2,361,951 | Livermon | Nov. 7, 1944 |
| 2,442,248 | Sampsell | May 25, 1948 |